Patented Apr. 22, 1941

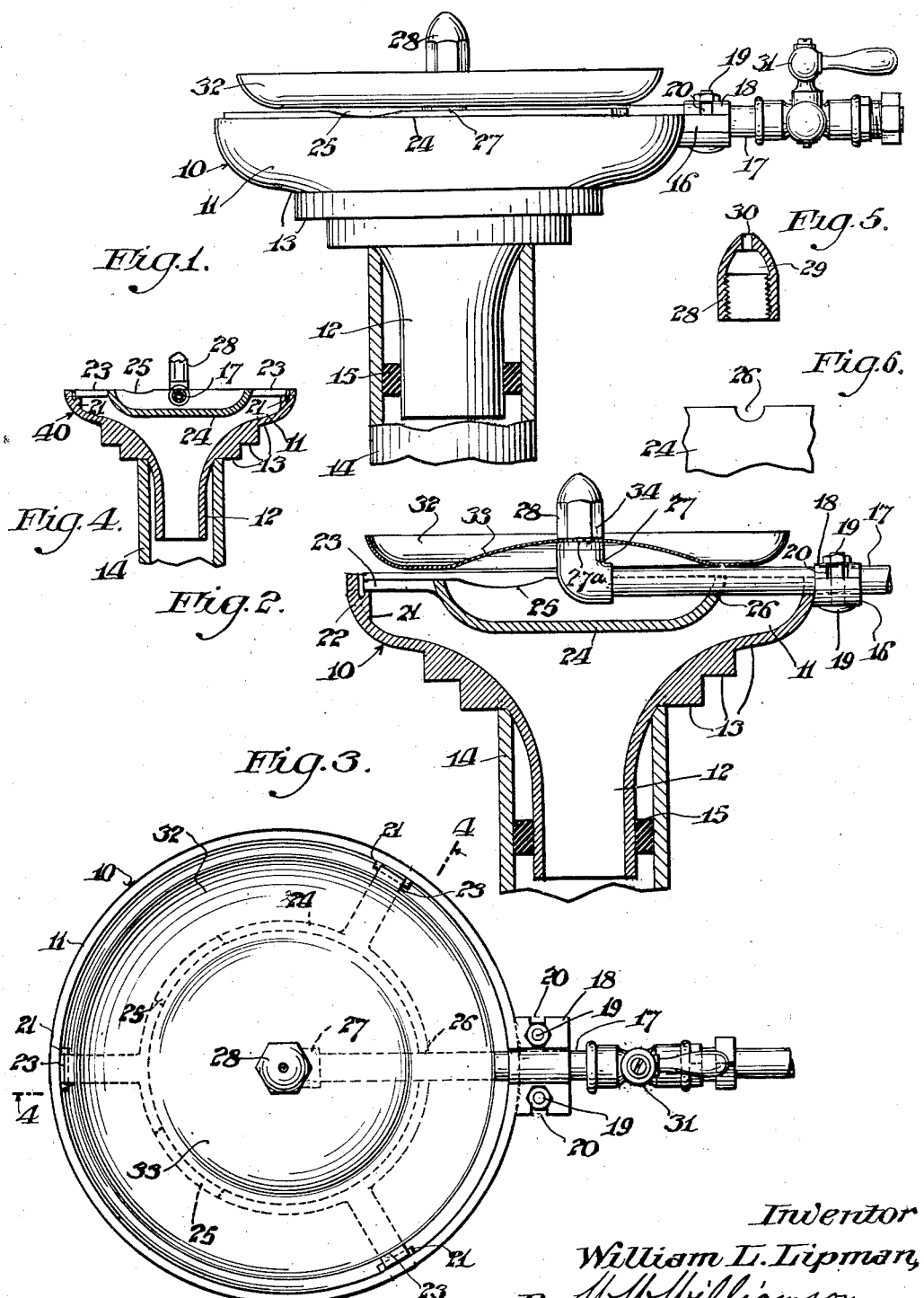

2,239,393

UNITED STATES PATENT OFFICE 2,239,393

POULTRY DRINKING FOUNTAIN

William L. Lipman, Washington Crossing, N. J.

Application April 4, 1940, Serial No. 327,754

6 Claims. (Cl. 119—74)

My invention relates to a new and useful poultry drinking fountain and has for one of its objects to provide an exceedingly simple and effective device of this character that may be readily and easily installed without the use of skilled labor or special tools, and is adapted to be mounted in a number of various sizes of drain pipe, either metal or terra cotta.

Another object of the invention is to provide a device of this character that is economical in the cost of maintenance, since its use eliminates many labor costs and the waste of water is reduced to a minimum due to the use of a valve which regulates the supply of water required for any size flock of poultry.

Another object of the invention is to provide a poultry drinking fountain which is sanitary and prevents the spread of disease since water cannot get upon the floor of the coop and the whole device can be readily and easily cleaned, especially due to the fact that the bowl and cup can be readily and easily removed, giving access to the funnel.

Another object of the invention is to provide a fountain of this kind which is automatic in operation, delivering a constant flow of clean, fresh water regardless of the pressure.

Another object of the invention is to provide a poultry drinking fountain which will not freeze in cold weather and eliminates the necessity for water heaters.

Another object of the invention is to provide a poultry drinking fountain which is sturdy, strong and durable, having no moving parts except the valve, wherefore there is practically nothing to get out of order and the device will withstand extraordinary wear and tear.

A further object of the invention is to provide a fountain of this kind which is inexpensive in the cost of manufacture combining all the features enumerated above which therefore can be marketed at a relatively low price.

Another object of this invention is to provide a poultry drinking fountain including a funnel having a portion or neck which is adapted to project into a standpipe of a drain and having a number of homocentric shoulders, any one of which will rest upon the upper edge of the standpipe and said funnel having interior lugs below the top edge of the funnel to receive the arms of a bowl held in place by a portion of the water supply line fastened to the funnel by a clamp, a portion of which is formed integral with the funnel and a saucer supported by the water supply line and held in place by the nozzle.

A further object of the invention is to provide an adapter to be mounted upon the neck of the funnel and engage the interior surface of the standpipe to assist in holding the funnel in a straight line and preventing it from being tilted.

A still further object of the invention is to provide a poultry drinking fountain adapted for use by baby chicks and upon the removal of one part, said fountain may be used for larger poultry.

With the above and other objects in view, this invention consists of the details of construction and combination of elements hereinafter set forth and then designated by the claims.

In order that those skilled in the art to which this invention appertains may understand how to make and use the same, I will describe its construction in detail, referring by numerals to the accompanying drawing forming a part hereof, in which:

Fig. 1 is a side elevation of a poultry drinking fountain constructed in accordance with my invention, and showing it mounted on a standpipe a portion of which is broken away and shown in section.

Fig. 2 is a vertical sectional view thereof.

Fig. 3 is a top plan view of the same.

Fig. 4 is a vertical sectional view on a reduced scale illustrating the saucer or tray removed so that the fountain may be used by larger poultry.

Fig. 5 is a longitudinal sectional view of the nozzle.

Fig. 6 is a fragmentary elevation of the bowl in the region of the opening which receives a portion of the water supply line.

In carrying out my invention as herein embodied 10 represents the funnel including a rather large flaring body 11 diminishing into a restricted or reduced neck 12. On the underside of the body of the funnel are formed a number of enlargements providing a plurality of homocentric shoulders 13 in different horizontal planes and of suitable diameters to fit different sized standpipes, one of which is shown and designated by the numeral 14.

When the neck 12 of the funnel is placed in the standpipe one of the shoulders 13 will rest upon the upper edge of such standpipe and is likely to prevent the funnel from moving about or wabbling, but in order to further steady said funnel, an adapter ring 15 of rubber or other suitable material has an interior diameter of the proper size to fit the neck of the funnel and an exterior diameter of a size that will fit the particular standpipe on which it is to be used.

Projecting from the rim of the funnel body is an integral clamp element 16 to receive a water supply pipe 17 which will be held in place when the companion removable clamp element 18 is secured in place by the fastening devices 19, such as bolts and nuts. The companion clamp member 18 may have slots 20 to receive the fastening devices, thereby permitting one of said fastening devices to be removed and said companion clamp member then slipped out from beneath the other fastening device.

On the inside of the funnel body, below the rim thereof, are formed a plurality of lugs 21 having channels 22 in their upper surfaces for a purpose to be presently described. These lugs are to be engaged by the outer ends of the radial arms 23 formed with the bowl 24 which is located within the funnel and the upper edge of said bowl may have one or more low spots 25 in its edge to permit water to flow out of the bowl at one or two locations, rather than over the entire edge of said bowl.

It is well recognized that water often creeps along horizontal or substantially horizontal surfaces and should this occur on the arms 23 and actually reach the ends thereof, it will be discharged into the channels 22 from which it will flow from one side or the other of the lugs into the funnel.

The bowl 24 has a notch 26 formed in its upper edge at a proper location to receive the water pipe 17, thereby preventing rotation of the bowl which would disengage the arms 23 from their lugs 21, and the pressure of said water pipe upon said bowl will prevent accidental removal or displacement of the bowl.

On the inner end of the water pipe 17 that terminates adjacent the center of the bowl 24, is an upturned L-fitting 27, having a threaded nipple 27a to receive the nozzle 28. This nozzle may be of any suitable exterior configuration, but preferably has a tapered interior dome 29 leading to a vertical outlet orifice 30 which causes water flowing through the same to produce a bubble on the exterior prior to the water flowing down the sides of said nozzle. This action is caused regardless of the pressure of water, since the flow is regulated by the valve 31 located outside of the fountain or the funnel portion thereof and interposed in the water line of which the pipe 17 forms a part.

This much of the structure provides a drinking fountain for larger poultry, since they can readily reach into the bowl 24 and even though they should hop upon the funnel or said bowl, the parts will not be disturbed or dislodged from their mountings.

In order to provide for watering small chicks, I use a removable saucer 32, having a pressed up central portion 33 with a central aperture 34 to fit over the nipple 27a and be held in place by the nozzle 28 when the latter is screwed onto said nipple. This saucer provides a holder for water which is in close proximity to the rim of the funnel so that small chicks may readily reach the same and yet the exterior diameter of said saucer is a sufficient distance inside of an imaginary extension of the rim of the funnel to cause any water flowing from said saucer to drop into the funnel for disposition through the drain, and prevent any of the water reaching the floor of the coop.

It is to be particularly noted that due to the relatively small size of the funnel neck, the space between said neck and the standpipe in which it is mounted and the smooth curved contour of the interior of the funnel will prevent rodents or other predators entering the coop through the drain pipe and the fountain.

From the above description, it will be apparent that a constant supply of running water is provided which enters either the saucer or bowl, according to which one is in use and any excess water will flow from the receptacle in use at the time over the rim thereof into the funnel, thence into the standpipe and be carried off by a suitable drain to a place of disposal. As all excess water is immediately disposed of, none of it will fall upon the floor of the coop, so that the latter will remain dry and disease is unlikely to be spread among the flock.

Of course I do not wish to be limited to the exact details of construction herein shown and described, as these may be varied within the scope of the appended claims without departing from the spirit of my invention.

Having thus described my invention, what I claim as new and useful is:

1. A poultry drinking fountain comprising a funnel including a flared body and a diminished neck, the latter adapted to be inserted in a standpipe, a number of homocentric annular enlargements on the exterior of the funnel body providing shoulders, one of which will engage the upper edge of the standpipe into which the funnel neck is projected, an adapter mounted upon said neck for engagement with the interior of the standpipe, a plurality of lugs on the interior of the funnel but below the rim thereof and having channels in their top surfaces, a bowl, radial arms projecting from said bowl resting on said lugs, a clamp element formed with the funnel body, a water pipe resting in said clamp element and a notch in the upper edge of the bowl, said pipe projecting approximately to the center of said bowl, a removable clamp element, fastening devices to attach the removable clamp element to the first mentioned one and thereby secure the water pipe in place, an upturned L-fitting on the inner end of said water pipe, a nipple carried by said L-fitting, a saucer having a pressed-up apertured central portion fitting over the nipple and a nozzle screwed on said nipple to hold the saucer in place.

2. The structure in claim 1 wherein the bowl has at least one low spot in its rim, and a valve connected with the water pipe outside of the funnel.

3. The structure in claim 1 wherein the nozzle has an interior tapered dome leading to a vertical outlet orifice.

4. A poultry fountain including a funnel having a flaring body and a diminished neck, homocentric annular enlargements on the exterior of the funnel body providing shoulders, an integral clamp member projecting exteriorly from the rim of the funnel, lugs formed on the interior of the funnel below the rim thereof, a bowl having a notch in the edge thereof, arms projecting radially from said bowl and resting upon the lugs, a water pipe resting on the clamp member and the notch and projecting to approximately the center of the bowl, a removable clamp member, means to fasten the second named clamp member to the first mentioned clamp member and thereby hold the water pipe in place and prevent the bowl from rotating, and a nozzle carried by the inner end of said water pipe.

5. In a device of the character stated, a funnel including a flared body and a diminished neck, shoulders of different sizes on the exterior of the funnel body, lugs on the interior of said funnel body below the rim thereof, a bowl supported by said lugs, a water supply pipe secured to the funnel and engaging said bowl to assist in holding the latter in place and a nozzle on the inner end of said water pipe.

6. A poultry drinking fountain comprising a funnel, a clamp member formed as an integral part of said funnel, a water pipe resting in said clamp member, a companion clamp member coacting with the first mentioned one and embracing the water pipe, means to secure the clamp members together, a valve on said water pipe outside of the funnel, a fitting on the inner end of said water pipe, a nipple carried by said fitting, a saucer having an apertured pressed-up central portion mounted on said nipple and a nozzle on said nipple to hold the saucer in place.

WILLIAM L. LIPMAN.